United States Patent [19]
Copito

[11] Patent Number: 5,154,560
[45] Date of Patent: Oct. 13, 1992

[54] SELF-LOCKING LOCK NUT

[76] Inventor: Benjamin Copito, 20 Clent Rd., Great Neck, N.Y. 11021

[21] Appl. No.: 733,443

[22] Filed: Jul. 22, 1991

[51] Int. Cl.⁵ .............................................. F16B 39/36
[52] U.S. Cl. .................................... 411/266; 411/222; 411/433; 411/931
[58] Field of Search ............... 411/266, 280, 222, 223, 411/239, 242, 248, 281, 931, 269, 432, 433, 437, 229, 237, 238, 277, 335

[56] References Cited

U.S. PATENT DOCUMENTS

| | | | |
|---|---|---|---|
| 659,215 | 10/1900 | Delp | 411/222 |
| 846,593 | 3/1907 | Minne | 411/222 |
| 889,319 | 6/1908 | Martin | 411/268 |
| 999,529 | 8/1911 | Skelton | 411/931 X |
| 1,030,136 | 6/1912 | Skelton | 411/237 |
| 1,157,596 | 10/1915 | Sherman | 411/269 |
| 2,518,469 | 8/1950 | Harding | 411/931 X |
| 4,909,689 | 3/1990 | Komatsu | 411/222 |

FOREIGN PATENT DOCUMENTS

| | | | |
|---|---|---|---|
| 335003 | 1/1904 | France | 411/269 |
| 399010 | 6/1909 | France | 411/269 |
| 557284 | 5/1923 | France | 411/222 |
| 597120 | 8/1959 | Italy | 411/268 |
| 622653 | 1/1961 | Italy | 411/222 |
| 380448 | 9/1964 | Switzerland | 411/222 |
| 27822 | of 1896 | United Kingdom | 411/223 |

OTHER PUBLICATIONS

Tridair "Flatbeam" locknut, Design News, Mar. 23, 1987 p. 41.
Thomas' Register "Buddy Nut" advert. vol. 10, p. 17570.

Primary Examiner—Rodney M. Lindsey

[57] ABSTRACT

A self-locking lock nut assembly comprising working nut part (9) possessing a split annular sleeve extension upon which is mounted by springing locking part (10), which utilizes only the energy of vibration to translate counter-clockwise rotation of locking nut part (10) in a disengaging mode into a radial grip onto threaded bolt (6) through the split annular sleeve of working nut part (9) to prevent loosening counter-clockwise rotation of working nut part (9). The self-locking lock nut assembly possesses the capacity for a dynamic locking response to all modalities, directions and intensities of vibrational input to the degree required and proportional to the energy of vibration.

4 Claims, 1 Drawing Sheet

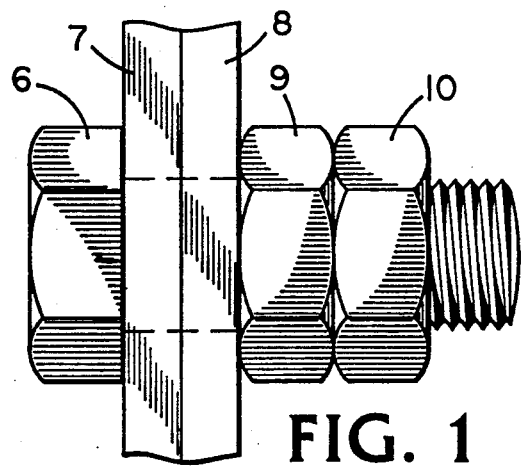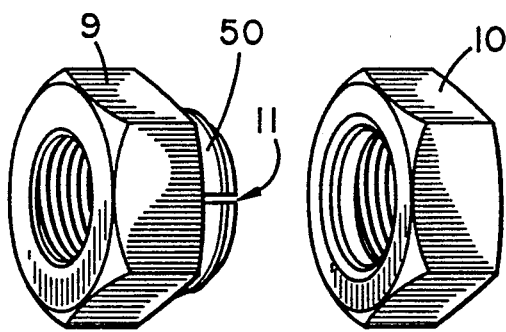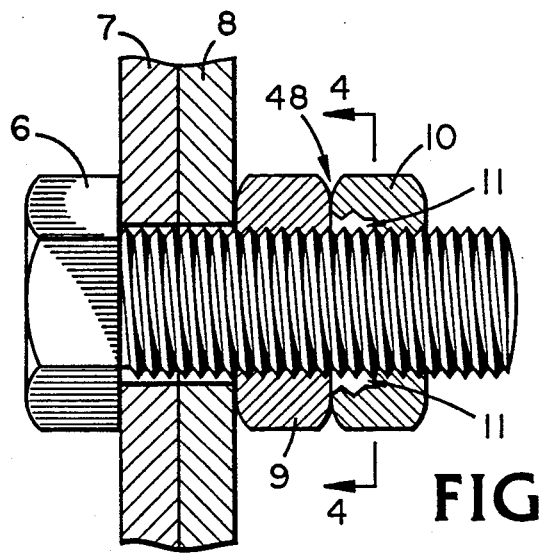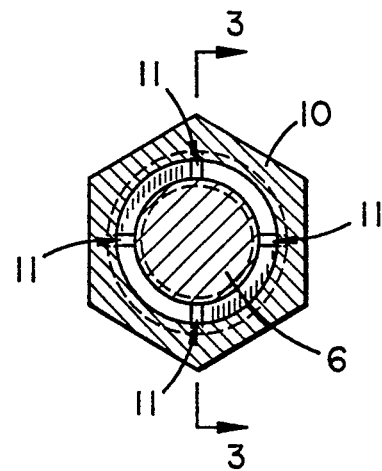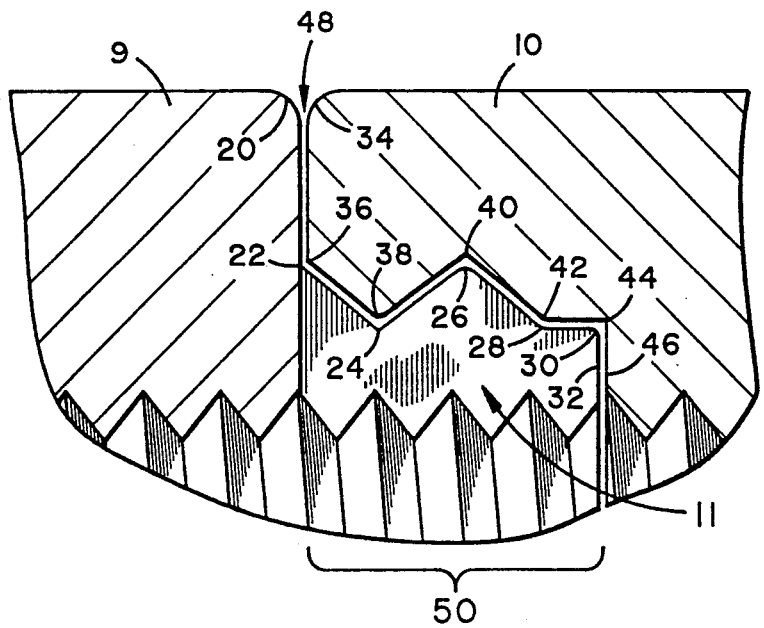

SELF-LOCKING LOCK NUT

BACKGROUND—FIELD OF INVENTION

This invention relates to devices utilized to securely lock fastener nuts against the tendency of fastener nuts to rotate counter-clockwise and eventually rotate off bolts because of varying modes, directions and intensities of the energy of vibration.

BACKGROUD—DESCRIPTION OF PRIOR ART

Locking fasteners of a wide variety of types are available to prevent the loss of integrity of the nut fastener. Most function by increasing the resistance of the nut to counter-clockwise rotation by providing added friction through pressing the fastener threads against the bolt threads either parallel or normal to the axis of the bolt. Some provide this added friction initially, at the time of installation through the use of a soft material liner of the fastener, in which the nut cuts its own thread as it is advanced to a closed position.

U.S. Pat. No. 659,215 to Doelp (1900) discloses a lock nut assembly in which the working nut part has protruding from it a spit sleeve with a cam-shaped exterior surface onto which is mounted a locking nut part with a complementary cam-shaped surface. The split sleeve portion, which is threaded like the main body of the working nut part, is clamped down by a rotation of the locking nut part. The cam-shaped surfaces are extremely expensive to machine; and the locking force is dependent upon the initial torque, bearing no relationship to the intensity of vibrational loosening. Also, a satisfactory locking is dependent upon the skill and diligence of the installer.

U.S. Pat. No. 846,593 to Minne (1907) discloses a locking nut part of small mass designed to impose eccentric bearing pressure on the working nut part to achieve an intense, distorting grip on the bolt. The assembly, consisting of two distinctly separate parts, is subject to the inconvenience of requiring one of each unit per installation, and the locking requires a different sized wrench for installation. Also, the locking force is dependent upon the initial torque, bearing no relationship to the intensity of vibrational loosening, and dependent upon the skill of the installer.

U.S. Pat. No. 4,909,689 to Komatsu (1990) discloses a lock nut consisting of two parts, one a working nut part with a truncated conical threaded extension and a locking nut part threaded onto the extension to compress the extension as the conical female threading of the locking nut part is advanced to high frictional contact. This invention effectively employs the locking nut part to advance over the conical threaded extension of the working nut part to effect a high degree of frictional union between working nut part and locking nut part. This variation of an old theme is deficient in that both parts locked strongly together are vulnerable to joint counter-clockwise rotation and loosening, as with all lock nuts dependent on a high frictional union between two nuts. Also, the frictional union between the two parts is dependent upon the ski of the installer: the need for two distinct and separate parts subjects the assembly to the inconvenience of requiring one of each unit per installation; and the presumed high effectiveness/cost quotient is both speculative and dubious.

Other methods of providing locking integrity involve either physical distortion of a washer over an available immovable projection or actual physical invasion of the bolt and/or nut, such as with a cotter pin through nut and bolt or the binding of threads of differing pitches of bolt and nut.

In all cases, except for locking methods involving actual physical penetration of bolt and/or nut or washer distortion over an available solid projection, the degree of locking grip is a function entirely of initial torque input of the locking mechanism at the time of installation. The degree of locking integrity is therefore dependent upon, among other factors, the individual installer.

The existence of so many different types of fastener locking devices attests to the almost infinite range of conditions tending to loosen nuts under the conditions of vibration of machinery and equipment. The problem of providing fastener locking integrity is vastly complicated by the varying modes, directions and intensities of vibration imposed upon the fastened machinery or equipment through its operational range. These varying conditions of vibration have heretofore made virtually impossible a rational, calculated solution to this problem generated by operational change and variability.

Additionally, the fail-safe current methods and devices, aside from requiring mutilation of the bolt and/or nut through drilling or other invasions, are incapable of maintaining a desired calculable torque in the fastener against the items fastened through a full range of vibrational experiences.

The very existence of so many different types of lock nuts illustrates not only the extent and variety of the problem of varying conditions of vibration, but imposes an enormous burden of manufacturing and stockpiling problems and its attendant diseconomies.

The existing varieties of locking fasteners depend, in order to function adequately, in almost all cases, upon the skill and attentiveness of the installer in applying initial locking input; and the possibility of ineffectiveness is multiplied under circumstances where fasteners must be removed for equipment or machinery inspection and maintenance.

OBJECTS AND ADVANTAGES

Accordingly, several objects and advantages of my invention are:

1. The working nut part and the locking nut part of my invention are factory joined by springing the locking nut part onto the protruding annular sleeve of the working nut part, and therefore comes to the place of application already assembled. This assembled condition precludes improper field assembly and provides greater convenience to the installer. In contrast, several existing types of locking fasteners come with two independent components: the seating type, spring washer type, and many wedge types. Additionally, wastage due to loss of one part is avoided.

2. Due to the unique operational design of my self-locking lock nut assembly, to be described hereafter, the locking nut part of the lock nut assembly requires no applied torque. The working nut part and locking nut part are advanced clockwise simultaneously to closure; the working nut part is torqued to the desired degree; and the locking nut part is left in a neutral, untorqued position. Virtually al existing friction-type locking fasteners require an initial torque, either clockwise or counter-clockwise, applied to the locking nut part, to establish a locking grip. Thus, the resistance of virtually all existing friction-type locking fasteners to rotational withdrawal must be dependent, in addition to other factors, upon the initial torque applied to the locking part. The instant invention provides no initial locking input, but impairs a subsequent locking force by virtue of, and in response to, vibrational energy.

3. The unique design and operational character of my self-locking lock nut assembly permits and sustains the initial torque of the working nut part of the assembly through all modes, directions, and intensities of vibration. In contrast to my invention, all other existing types of locking fasteners subject to varying modes, directions, and intensities of the energy of vibration over time are subject to the release of initial torque.

4. The lock nut assembly is readily removable, without distortion or damage sustained, and can therefore be re-used repeatedly. Several types of existing locking fasteners are non-reusable after either only one use or after a limited number of uses.

5. The instant invention is intended to provide for automatic, vibrational-responsive, variable intensity locking of a nut against vibrational release.

DRAWING FIGURES

FIG. 1 shows an elevation of two solid plates joined together by a bolt and a nut, with the working nut part locked in place with its accompanying, sleeve-mounted locking nut part.

FIG. 2 shows a perspective of the working nut part with split annular sleeve and the grooved and threaded locking nut part.

FIG. 3 shows a vertical longitudinal section through the lock nut assembly indicating the locking nut part mounted on the split annual sleeve of the working nut part. A part of this figure, highlighting the configuration and geometry of the split annular sleeve and the complementary locking nut part of the assembly is indicated as expanded on FIG. 5.

FIG. 4 shows a vertical section taken through the locking nut part to indicate the location and number of splits in the annular sleeve. A vertical section is taken to refer back to FIG. 3.

FIG. 5 shows an expanded section of FIG. 3 indicating the configuration and geometry of the split annular sleeve and the complementary interior configuration and geometry of the locking nut part.

REFERENCE NUMERALS IN DRAWING 6 bolt head
7 solid plate
8 solid plate
9 working nut part of lock nut assembly
10 locking nut part of lock nut assembly
11 split in annular sleeve of working nut part
20,22,24,26,28,30 & 32 define configuration and geometry of split annular sleeve of working nut part. 26,28 & 30 are rounded.
34,36,38,40,42,44 & 46 define configuration and geometry of complementary interior surface of locking nut part. 38 & 42 are rounded.
48 uniform gap between 9 and 10
50 split annular sleeve of working nut part

Description—FIGS. 1 to 5

FIG. 1 shows an elevation of a bolt 6 and the lock nut assembly 9 & 10 connecting two solid pates 7 & 8.

FIG. 2 shows a perspective view of lock nut working part 9 and locking part 10 separated. The split annular sleeve of working nut 9 is shown, with one of four splits 11.

FIG. 3 shows a longitudinal section through lock nut assembly 9 & 10 with the split annual sleeve and adjacent area encircled to indicate that the sectional area is shown expanded in FIG. 5 A cross section 4—4 is taken through locking nut part 10.

FIG. 4 shows cross section 4—4 of FIG. 3, indicating the four spits 11 in the annular sleeve. A cross section 3—3 is taken to refer back to FIG. 3.

FIG. 5 shows the expanded section of FIG. 3 indicating parts of working nut part 9 and locking nut part 10 highlighting external, ridged surface 22, 24, 26, 28, 30 & 32 of the split annular sleeve extension, representing a plurality o concentric intersecting surfaces and complementary concentric interior intersecting surface 36,38,40,44 & 46 of locking nut part 10.

Operation—FIGS. 1,2,3,4 & 5

My invention is designed to provide a lock nut assembly consisting of a working nut part with a split annual sleeve extension upon which is mounted a locking nut part to function as a self-locking mechanism responsive over all modes, directions and intensities of vibration.

Locking nut part 10 is factory mounted onto the split annular sleeve, with point 38 being sprung over point 26 to form a two piece, joined but separately rotating assembly 9 and 10. The inherent flexibility of the annular sleeve, enhanced by the splits, provides for this capability.

Working nut part 9 and locking nut part 10, of marginally greater weight than the working nut part, are simultaneously advanced clockwise on the bolt. When working nut part 9 is in place adjacent to the material to be joined, it is provided with such clockwise torque as is desired or required. Locking nut part 10 is left untorqued, with relative freedom to rotate minutely clockwise or counter-clockwise.

The introduction of vibrational energy into the lock nut assembly from the machinery or equipment of which it is now a part will at some point begin to introduce a loosening or counter-clockwise tendency in both &he working nut part 9 and locking nut part 10. However, working nut part 9, torqued clockwise and having a frictional resistance to counter-clockwise rotation in excess of that of the locking nut part 10, will be more retarded from counter-clockwise rotation and loosening than locking nut part 10.

Consequently, locking nut part 10 will first tend to rotate counter-clockwise on the bolt and thereby cause a wedging effect of plane 38-40 of locking nut part on plane 24-26 of the split annual sleeve of working nut part 9, effectively inhibiting counter-clockwise loosening of the working nut part 9 on the bolt.

To the degree that the vibrational energy of the system would tend to loosen working nut part 9 by counter-clockwise rotation on the bolt, to the same degree would the counter-clockwise, countervailing rotational tendency of locking nut part 10 more securely cause spit annular sleeve of the working nut part 9 to grip the bolt through the wedging action of plane 38-40 on plane 24-26.

Hence, locking nut part 10 of the assembly will provide resistance to unwinding of working nut part 9 through all possible modes, directions and intensities of vibrational input, in the degree required and proportional to the energy of vibration. Thus the designation of self-locking lock nut.

It is possible, but by no means essential to the performance of the assembly, to impart an initial locking torque to the assembly by counter-clockwise torquing of locking nut part 10 after torquing working nut part 9 clockwise and holding working nut part 9 in place with a wrench.

The unique, dynamically induced locking function of locking nut part 10 provides for a locking-releasing-locking response through a limitless number of cycles of vibrational modalities and intensities, proportional to the degree of vibrational intensity.

In brief, the locking function is available when, as and to the degree required to restrain working nut part 9 from counter-clockwise release through all vibrational modalities.

The assembly is released by advancing locking nut parts 10 slightly clockwise, then rotating both assembly parts counter-clockwise simultaneously, in a reversal of the method of advancing assembly on the bolt.

Summary, Ramifications, and Scope

Thus the reader can see that the self-locking lock nut provides a quantum improvement over all existing types of fastener nut locking devices in that the principle upon which it is based, namely the utilization of the energy of vibration itself for the inhibition of the loosening tendency of a working nut part, represents the summit of efficiency and reliability.

While my above description contains many specifics, these should not be construed as limitations on the scope of the invention, but rather as an exemplification of one preferred embodiment thereof. Many other variations are possible. For example, while only four slits in the annular sleeve are shown, the number may be more. Also, the principle outlined is applicable to the connectors of moving parts of machinery and equipment which are subject to forces inclusive of vibration.

Materials which are suited for the manufacture of this invention include metals, plastics, compressed synthetic fibers such as nylon and Dacron plastic composite fiber materials, and all other solid materials possessing elastic properties to some degree.

Accordingly, the scope of the invention should be determined, not by the embodiment illustrated, but by the appended claims and their legal equivalents.

I claim:

1. A self-locking lock nut assembly comprising:
  a. a working nut part with a split annular sleeve extension on one side, said split annular sleeve extension bearing a plurality of external intersections of plane tapered surfaces concentric about and extending along the long axes of a bolt and said working nut part, said plurality of concentric, external, intersections of plane tapered surfaces being complementary to
  b. a plurality of internal intersections of plane tapered surfaces of a locking nut part concentric about and extending along the long axes of said bolt and said locking nut part, enabling factory mounting of said locking nut part by springing on said split annular sleeve extension of said working nut part, thereby joining both parts while enabling independent rotation; whereby preceding counter-clockwise rotation of said locking nut part, in dynamic response to vibrational energy, induces planar compression upon said split annular sleeve extension, arresting the loosening counter-clockwise rotation of said working nut part.

2. The self-locking lock nut assembly of claim 1 whereby, after the working nut part has been torques clockwise, movement of the locking nut part, of marginally greater weight, imparts through counter-clockwise rotation, a planar wedging effect on an adjacent, concentric, complementary plane tapered surface of said working nut part split annular sleeve extension, thereby radially compressing said split annular sleeve extension to grip a bolt firmly through all locking modalities and intensities of vibration.

3. A self-locking lock nut assembly comprising:
  a. a working nut part with a split annular sleeve extension on one side, upon which extension is factory mounted by springing
  b. a locking nut part, wherein said split annular sleeve extension, processing the same internal threading and pitch as said working nut part, also possesses an external, concentrically ridges annular surface which, in cross-section, represents a plurality of intersecting plane tapered surfaces, a horizontal plane surface, and a vertical plane surface, said plurality of intersecting plane tapered surfaces being concentric about and extending along the longitudinal axes of a bolt and said working nut part, a plurality of said concentric plane tapered surface intersections being rounded to enhance spring mounting of said locking nut part.

4. The self-locking lock nut assembly of claim 3, wherein:
  a. the interior of the locking nut part comprises a female thread of the same diameter and pitch as the working nut part and also a ridged annular surface which, in cross-section, represents a plurality of intersecting plane tapered surfaces, a horizontal plane surface, and a vertical plane surface, said plurality of intersecting plane tapered surfaces being concentric about and extending along the axes of a bolt and said locking nut part, a plurality of said concentric plane tapered surface intersections being rounded at their angles of intersection to enhance spring mounting of said locking nut part,
  b. said concentric, intersecting plane tapered surfaces of said locking nut part being complementary to said exterior concentric intersecting plane tapered surfaces of said split annular sleeve extension of said working nut part, with a minute uniform gap effected between said interior and exterior intersecting plane tapered surfaces.

* * * * *